United States Patent [19]

Rossiter

[11] Patent Number: 5,665,413
[45] Date of Patent: Sep. 9, 1997

[54] FOOD COMPOSITION DERIVED FROM FRUIT OF GENUS ACTINIDIA

[76] Inventor: Michael Joseph Paul Rossiter, 18 Balloch Street, Hamilton, New Zealand, 2001

[21] Appl. No.: 389,831

[22] Filed: Feb. 16, 1995

Related U.S. Application Data

[63] Continuation of PCT/NZ93/00068, Aug. 16, 1993.

[30] Foreign Application Priority Data

Aug. 17, 1992 [NZ] New Zealand .................... 243986

[51] Int. Cl.$^6$ ............................................. A23L 1/212
[52] U.S. Cl. .................... 426/565; 426/615; 426/640; 426/577; 426/384
[58] Field of Search ........................... 426/640, 615, 426/599, 616, 565, 566, 567, 577, 573, 384

[56] References Cited

U.S. PATENT DOCUMENTS 5,089,285 2/1992 Nozaki et al. .................... 426/573
5,298,275 3/1994 Balasingham et al. ............. 426/599

FOREIGN PATENT DOCUMENTS

0485193A1 5/1992 European Pat. Off. .
89 09188 7/1989 France .
WO90/07883 7/1990 WIPO .
WO91/03172 3/1991 WIPO .

OTHER PUBLICATIONS

Search Report of corresponding PCT Application.

*Primary Examiner*—Jeanette Hunter
*Attorney, Agent, or Firm*—Darby & Darby, P.C.

[57] ABSTRACT

The present invention is a composition and a method for its manufacture, from fruit of the genus Actinidia. Compositions according to the present invention often exhibit an unusual characteristic in that they undergo a viscosity increase when subjected to a shearing force, or a combination of shearing and aeration. The composition, possesses differences with comparable compositions obtained by other fruit products and thus represents a useful alternative thereto. However, the unusual property of viscosity increase makes the composition suitable as a replacement for many dairy products. Disclosed are several examples of the use of a composition in this role including its use in the preparation of non-dairy food products, including mayonnaise and a soft serve ice-cream product, which emulates dairy equivalents.

40 Claims, 2 Drawing Sheets

FOOD COMPOSITION DERIVED FROM FRUIT OF GENUS ACTINIDIA

Continuation of PCT/NZ93/00068, Aug. 16, 1993.

TECHNICAL FIELD

The present inception is directed to the food manufacturing industry. Specific attention is given to fruit from the genus Actinidia, and in particular *Actinidia Chinensis*. Compositions derived from methods described herein typically resemble a puree and are often characterised by increasing in viscosity when subjected to a shearing force or shearing force in combination with aeration. These properties make such embodiments suitable as a base material in the preparation of food products such as mayonnaise, desserts and ice-cream products.

BACKGROUND ART

Many fruit have been exploited for their use in the preparation of juices and purees. These are then commonly used in the preparation of other foodstuffs, often being used in the capacity of a base material, extender or flavouring agent. However, virtually all known juice and puree manufacturing processes have been standardised and based upon conditions optimised for apples. Unfortunately, the fruit of the genus Actinidia (the best known of which is the kiwifruit or *Actinidia Chinensis*) have their own inherent problems which does not make them amenable to the known prior art processes.

For instance, taking kiwifruit as being representative of most fruit of the genus, the fruit is very high in acidity, chloroplasts (giving the fruit its green colour), enzymes and other components not normally found in any appreciable quantities in other fruits, such as apples. Consequently, kiwifruit does not behave favourably under the conditions used for other fruit.

For example, the pulp of a fruit will readily change colour to straw or brown, a problem which as dogged juice manufacturers as a brown juice product does not appeal to the public. However, discolouration is less of a concern for some product applications, especially where the composition is to be used in the preparation of another product.

However, discolouration is also accompanied by other changes to the nature of the product. Perhaps the most significant of these are the renowned kiwifruit 'catch' which is a mild unpleasant feeling left in the throat after consuming some kiwifruit products. The cause of catch has yet to be specifically identified though theories include denaturing of chloroplasts, the presence of components normally residing in the skin and hair of the fruit, oxidation products, the presence of calcium oxalate, reaction products between added and naturally occurring components, as well as various other side reactions. The catch factor, where it appears, can be undesirable as it detracts from the taste and pleasant qualities of any food product. Consequently, kiwifruit has been precluded from use in many areas where it might otherwise be used due to the catch problems which appear to result predominantly from the temperamental nature of the fruit of the genus and their intolerance to the relatively harsh treatment by prior art fruit processing techniques.

A further problem of most prior art processes is that they produce a composition whose qualities merely resemble that of the fruit from which it is desired, and often the resulting product or compositions is poorer in quality than the natural fruit. In many cases, the product or composition is suitable merely as an extender, or as an alternative and more convenient form of introducing fruit into a product. However, it has been discovered during research by the applicant that fruit of the genus Actinidia contain components which can extend the use of a derived puree type composition beyond the normal applications of such compositions.

It is now considered by the applicant that such components are likely to include pectins occurring in the kiwifruit so that a puree type composition derived from the fruit will typically exhibit the unusual ability to thicken upon the application of the shear force and/or aeration. It is also considered that the fibres within the fruit may also contribute to the thickening process. These fibres may be cellulose fibres though it is noted that cellulose fibres will occur in other fruit yet other fruit do not exhibit these properties. Kiwifruit products prepared to date according to the prior art methods, do not exhibit this ability and thus all prior art kiwifruit compositions are unable to be used for some of the applications of the present invention, such as in the use of the thickened composition such as mayonnaise, desserts and ice-cream type products.

It is therefore an object of the present invention to address the problems of the prior art, or at least to provide the public with a useful choice.

Further aspects of the present invention will now be described by way of example only.

DISCLOSURE OF INVENTION

According to one aspect of the present invention, there is provided a composition derived from the fruit of the genus Actinidia, characterised in that its viscosity will increase upon at least the application of a shear force or a shear force in combination with aeration.

According to another aspect of the present invention there is provided a composition, substantially as described above, in which a substantial proportion of volatile fruit components have been removed by a deodourisation step.

According to a further aspect of the present invention, there is provided a food product having at least 40% over-run comprising:

a composition derived from the fruit of the genus Actinidia, said composition characterised in that its viscosity will increase upon the application of a shear force.

According to yet a further aspect of the present invention, there is provided a soft-serve ice-cream product, having an over-run of at least 40% comprising a composition derived from the fruit of the genus Actinidia, and a sweetening agent comprising at least a mono-saccharide or a poly-saccharide, and in which the components have been subjected to the conditions of a conventional ice-cream making process or machine.

According to yet a further aspect of the present invention, there is provided a method for the preparation of a composition exhibiting characteristics of thickening under a shear force, or shear plus aeration, said composition being derived from the fruit of the genus Actinidia, prepared according to a method comprising steps of:

comminution;

removal of skin material;

deodourising.

The present invention is predominantly directed to the preparation of a composition suitable for use as, or in, food products derived from the fruit of the genus Actinidia. It is envisaged that typically the kiwifruit (*Actinidia Chinensis*), as a widespread commercial crop, will be most commonly used in the application of the invention.

Most compositions according to the present invention will be more like a puree in consistency than a juice. Accordingly most, but not necessarily all, embodiments of the present invention will have a total solid content comparable to that in the natural fruit from which it is derived. This will typically yield a composition whose viscosity, at 20° C., is 2,000 cp or greater. Such a composition can therefore be used in the manner of many purees, typically as an extender, means for inducing solid material, or flavouring agent etc. Greater concentrations of a kiwifruit composition may also be obtained according to the present invention though care should be taken during any concentration steps as any thickening characteristics of the composition can be easily and substantially impaired (see later).

However, one novel characteristic of most embodiments of the composition according to the present invention, is that they will thicken under conditions such as normally encountered during the preparation of a soft-serve ice-cream product from an ice-cream precursor. In fact, most embodiments will thicken and increase in viscosity when subjected to a shearing force. In most embodiments, this may be further enhanced by or partially dependant upon aeration, or the presence of added sugars.

This characteristic is unique to the present invention as no other currently known fruit product possesses this ability unless a significant portion of stabilisers or getting agents have been added. In many instances, even their addition may be insufficient to provide a composition which emulates many of the characteristics of those of the present invention. The applicant is aware of only two other substances which thicken upon exposure to a shearing force (e.g. such as that of a vortex mixer or a technique which reduces the average size of insoluble particles) and those are cream and some of the micro-crystalline cellulose products. This specific characteristic, of thickening upon exposure to a shear force or shear force with aeration, enables a composition according to the present invention to be used in a manner denied to other fruit puree products. For instance, the invention may find use in many applications where cream or dairy products have traditionally been used. A composition according to the present invention has successfully been used in the formulation of a soft-serve ice-cream and a mayonnaise, and in many respects the present composition may be far superior to many of the equivalent dairy products.

The present invention possesses other qualities allowing it to mimic dairy based products such as cream. The nature of the product is such that once aerated, enclosed bubbles will not tend to be released. Consequently, an aerated composition will have a high degree of standability (in loose terms, an ability to maintain its degree of aeration), especially when compared to dairy products. For many embodiments the only manner in which the bubbles can be released and the composition returned to a substantially non-aerated form, is by boiling the composition. As a consequence most compositions according the present invention may find use in aerated and over run products which will hold a substantial proportion of their aerated properties at room temperature or higher.

The presence of bubbles can also help increase the viscosity of the product, and thus such forms of the present invention may also be used as a thickening or bodying agent, including products which may be stored or subjected to temperatures of room temperature or higher. As can be appreciated, a composition according to the present invention may be used as an alternative to traditionally used stabilizers and thickening agents, as a replacement for many dairy components, and as a novel composition able to confer properties to many food products into which it is incorporated and which may otherwise be unobtainable. In addition, it is a purely plant based product and may find ready use as a substitute for the dairy content in many foods for people having a allergies to dairy products, and for vegetarians.

Further, an aerated composition appears to mimic the creamy characteristics normally associated with dairy products. While the interaction between a foodstuff and the palate which confers the impression of creaminess to a person is not precisely known, it is believed that the relatively stable air cells present in an aerated composition help give rise to this effect. The standability of the product has been previously discussed, and this is due primarily to the stability of the air bubbles in cells formed in an aerated composition. These, in many trials performed by the applicant (though there is some dependence upon manufacturing technique), are of a relatively uniform size, in contrast to many ice-cream products in which the air cells are rather fewer in nature and of a broad range of sizes. It is possible that these fool the tongue and palate into thinking the product is creamy in character, perhaps mimicking flat globules in dairy products and with perhaps the small air cells acting as cushioning type lubricant. Whatever the exact reason for the effect, it is within the scope of the present invention to provide an aerated composition which mimics or resembles many conventional 'creamy' dairy products.

It is considered by the applicant the naturally occurring pectins and fibres within the kiwifruit and various other members of the genus are responsible for, or contribute to, many of the unique characteristics of a composition according to the present invention. However this does not preclude other components within the fruit causing or contributing to the various effects.

Kiwifruit which has merely been pulped, does not appear to appreciably embody many of the unique characteristics of a composition. However, compositions which have been subjected to one of the preferred methods described herein do. It is believed that this may perhaps be particularly the result of the application of heat and/or an interaction between the pectins and sugars, either added or already present. Undoubtedly, some heating could enhance such reactions (which will not normally occur appreciably within the life span of the normal fruit). However, it is also noted that most of the unique characteristics can be removed by processing fruit according to prior art methods. In these cases it is considered that the application of excessive heat and/or concentration steps are responsible for the loss in desirable properties. For instance, it is possible that the application of excessive heat can promote other competing reactions which interfere, produce products which interfere, or destroy the desirable components such as pectins, fruit fibres and desirable components. Investigations into prior art processes have discovered that samples removed during concentrating and evaporation processes (typically traditional evaporation steps heating the composition over 45° C., especially for extended periods) have lost their desired viscosity increasing characteristics. At this stage, the kiwifruit pulp is subjected to reasonable heat for an extended period of time and this may be one factor in the loss of desired characteristics. However, at this stage the concentration of components is also raised. This is one other factor which can promote reactions which can interfere or destroy desirable components. Consequently it may be desirable to avoid processes which concentrate a pulp appreciably, especially if such processes are performed at elevated temperatures.

Accordingly, most embodiments of the composition will not be substantially concentrated, unless this has been performed under relatively cool conditions. Accordingly, most compositions will hot be concentrated by an increase of more than 100% when compared to the bulk raw fruit. Many embodiments will not be concentrated to more than 50% or higher as compared to the bulk fruit. Typically for ripe fruit (for kiwifruit this being typically 13–15 Brix) the sugar level of a resulting composition (other than any added sugars) is 20 Brix or less. However, within the constraints and guide lines mentioned above, compositions which lie outside of these ranges may be still be prepared. Concentration methods such as freeze drying, roller drying and low temperature vacuum drying can be used with care if a more concentrated product is required.

In order that a composition can be used in the preparation of various other food products, it is generally desirable that some of the intense flavour characteristics of the fruit are removed. Generally a deodourisation step which removes most of the volatile components of the fruit will be sufficient. A resulting composition will still have some flavour attributes which will enable the source from which a composition was derived to be identified. However, the flavour level will be sufficiently low that the flavours normally employed in an ensuring processes will tend to mask any residual fruit flavour. In many embodiments, the residual flavour in a deodourised composition is not significantly worse than for a corresponding apple composition which is subsequently used in food processes. If necessary, additional steps according to known technology can be employed to further reduce flavour components remaining in the fruit pulp or composition though once again it is noted that it is generally desirable to avoid conditions which degrade the naturally occurring pectins or stabilising type components of the fruit. Generally this means avoiding extended periods of elevated temperature especially where the material has been significantly concentrated.

Typically deodourising will remove the more volatile components which are typically aldehydes and esters, such as hexanal, ethyl butanoate, E-hex-2-enal, methyl butanoate etc. While these may be pumped from a pulped material under a vacuum (and on a lab bench this has been performed in a rotary evaporator) the process is generally accelerated if the fruit material is heated. In two preferred embodiments of a method to be described later, either the whole fruit or a pulped material is heated to a relatively high temperature for a short period.

In one preferred method, there is included an initial cooking step. This has several roles including allowing many volatile components to escape from the fruit material, helping soften the fruit, and, it is also thought, to allow naturally occurring pectins to interact with any sugars present. The relatively high temperature (in excess of 80° C.) of this step is generally sufficient for a proportion of volatile components to boil from the fruit material, especially if also subjected to a vacuum. Various methods may also be used to heat the fruit material. In one method, the whole fruit are plunged into heated water and subsequently removed. Other embodiments may rely upon the use of stream, radiation, microwave energy or other various heating forms, though methods which more rapidly achieve even heating of the fruit material will often be preferred.

It has been found that subjecting the fruit material to a high temperature for a relatively short period does not significantly affect the components which contribute to thickening of a composition under a shear force. In fact, some heating may appear to be necessary to activate these components though it is apparently elevated temperatures for extended periods which can eventually have an adverse affect.

Dwelling on the subject of heat damage, deterioration of desirable characteristics will be a function of both the temperature sustained by the fruit material and the period. Consequently, the applicants have applied a rather rudimentary method of determining what will be acceptable in many cases, based on trial and experimentation. It appears that for a method of preparation of a composition, the multiplication product of the temperature (in degrees centigrade) and the duration (in minutes) should not exceed 8,500 degree minutes. However, it is preferable that an even lower figure is chosen and ideally the product will not exceed 3,500 degree minutes. It is noted that the temperature would be the average temperature for the duration and that it is the accumulated sum of the products throughout the entire method which is to be compared with the idealised figure.

It is also noted that only periods in which the fruit material is subjected to 40° C. or higher need to be taken into account, as there appears to be little observable deterioration below this temperature, perhaps because any reactions are so slow at these lower temperatures that the material will deteriorate or spoil in other manners first. Consequently, deodourisation and any cooking steps are likely to be the step most likely to introduce a high temperature to the fruit. As a general rule, it appears preferable to subject fruit material to a high temperature for a short period during deordourisation, than for a lower temperature for an extended period. The higher temperature is also more likely to efficiently remove volatile components, as this will generally be above the boiling point (at the particular pressure the material is subjected to) for many of those components.

Other methods of deodourisation may also be performed. These may be separate steps to and initial heating or cooking step and may draw upon known techniques. Performing multiple passes through a deordourisation step may also be performed in some embodiments. This will typically be influenced by the requirements of the resulting composition.

In some embodiments of the present invention, it is desirable to add sugar to the fruit material. This may be solely for the purpose of raising the total solid contents of the composition (rather than by evaporation or concentration). It may also be to provide the required level of sweetness in the resulting composition. Also, there is a known interaction between pectins and sugar (particularly maltodextrin) which enhances the stabilising ability of these substances. The type of sugars is open to choice though polysaccharides such as sucrose may be more difficult to dissolve or bring into solution. There is also a possibility that sucrose may under so inversion reactions under certain conditions. The highly acidic nature of the pulp of the kiwifruit and other Actinidia fruit may promote this acid catalysed reaction should the conditions be right. While such reactions are not entirely unacceptable, it can introduce a degree of unpredictability into the nature of the resulting composition. Consequently many embodiments of the present invention, if they do introduce an added sugar, will often rely upon a mono-saccharide, or at least reduce the proportion of sucrose present in the composition. Various other sugars and sweetening agents may also be used in various embodiments of the invention.

There are various other considerations in performing the invention however these will be discussed in the ensuing examples for putting the invention into effect.

Generally a composition will lack the strong green colour of kiwifruit and will be substantially colourless or light in colour, though this will also be dependent upon any filtering, screening and decolourising steps which may be employed in a method according to the invention. The composition will typically be a viscose fluid material. The viscosity will often be 2,000 cp or higher at 20° C. though this will depend upon the exact conditions and method which is being performed, as well as the user requirements for the end product. The amount of insoluble matter will typically be influenced by any filtering or screening processes. Any homogenisation steps, especially if they introduce a shearing force, will tend to further break down the size of any insoluble material so that it is possible to obtain a product which is much smoother in texture than a traditional puree.

BEST MODES FOR CARRYING OUT THE INVENTION

EXAMPLE 1

Figure 1A:
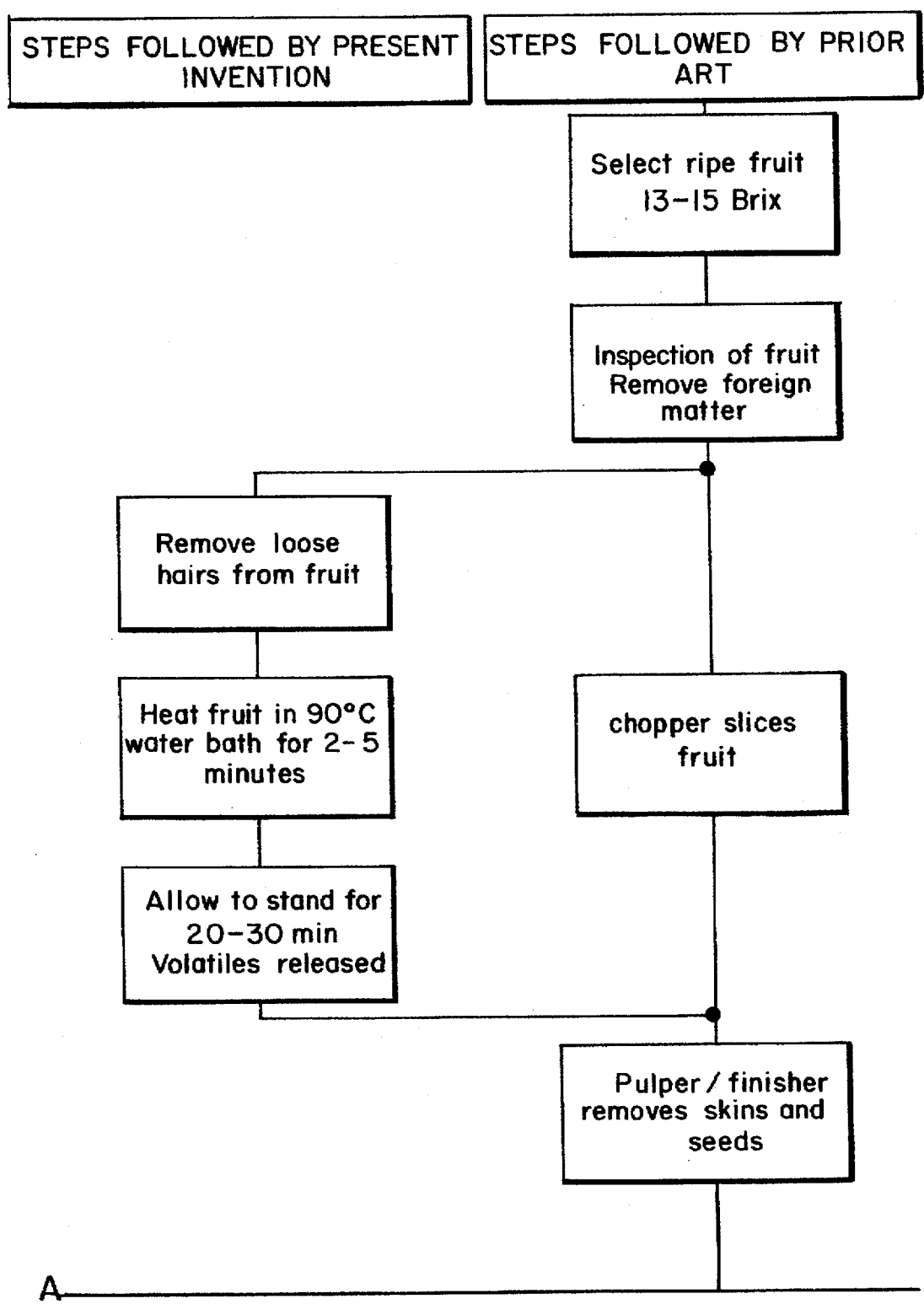
FIG. 1A and FIG. 1B are a flow diagrams of one preferred method according to the present invention.

The ensuring method is more suitable for a bench-scale or small-scale operation. It may therefore be desirable to perform some modifications to the steps described herein before implementing the process on a larger scale, and it is envisaged that a skilled addressee of the art would be readily able to put such an operation into practice given the description herein.

Step 1 SELECTING THE FRUIT:

For this example, kiwifruit have been selected as being the representative fruit. Preferred are ripe fruit which are typically characterised in having a Brix level of 13–15. Variations in the Brix level may be accommodated though this may require the addition of sweetening agents such as sugars if a particular Brix level is to be achieved in the end product.

Initially fruit may be screened to remove foreign matter or fruit damaged beyond use. Monitoring of the feed stock may be desirable so that calculations for additives (such as additional sweetening agents) may be made.

Step 2 REMOVING HAIR FROM THE KIWIFRUIT

An optional, but recommended step. Any standard process may be used to remove at least the loose hairs on the outside skin of the kiwifruit. The skin may be removed totally at this stage, or at a later stage such as prior to comminution.

Step 3 HEATING THE KIWIFRUIT

The whole fruit is then typically heated, partially to allow volatile components to escape. While volatile components may still escape through the skin of the fruit, the removal of these components is likely to be accelerated if the skin has been previously removed and/or the fruit has been broken into smaller pieces.

One method of heating involves the immersion of the fruit into water maintained at a temperature in excess of 80° C. A particular embodiment uses water maintained at 95° C. into which the kiwifruit are immersed for approximately 3–5 minutes. This is usually of a sufficient duration to heat the fruit to its centre. With smaller fruit or pieces, this time may be reduced.

Step 4 ALLOWING THE KIWIFRUIT TO STAND

After heating as aforesaid, the fruit are then allowed to stand. Typically the fruit may be placed in a holding section such as a large vat for duration of approximately 30 minutes. While the collective fruit will gradually cool, a substantial proportion of the residual heat is retained.

While standing, the kiwifruit continues to slowly cook and during this phase a significant amount of the volatile aroma and flavour constituents escape from the kiwifruit. Typically these conditions are sufficient to produce a substantially odourless and relatively tasteless composition. It may however be desirable to enhance the step by venting the vat to remove escaping volatile components.

As a note it has been found that if significant comminution occurs before the heating and standing step as outlined above, the fruit releases some of the volatile aroma/flavour constituent into the resulting puree which results in these components being move difficult to extract. Consequently it is generally preferable to perform any slow cooking method such as described above on fruit material which is substantially whole or has been chopped into large fragments, but which has not substantially comminuted or homogenised.

Step 5 SEPARATING SKIN AND SEED MATERIAL AND SUBSEQUENT COMMINUTION

At the next step the fruit may be passed into which is referred to in the trade as a fruit finisher. This comminutes the flesh and separates the skins and a substantial proportion of the seeds therefrom. The skin and seeds of the kiwifruit may be separated from the flesh by extrusion of the fruit material through a fine screen which comminutes the relatively soft, cooked kiwifruit flesh. While various screen sizes may be used, a size of 0.8 mm was found to be suitable.

Step 6 DEODOURISING THE PUREE

It is generally a preferred attribute of food extenders and additives that they introduce little of their characteristics into a product. Consequently, the present method includes a deodourisation step in which the comminuted fruit material is passed through deodourising apparatus to help remove a substantial proportion of aroma or flavour constituents which have not been flashed off at the initial cooking phase. Many various deodourising methods and techniques are known which may be successfully used through previous comments on heating and concentration are to be considered. It is also noted that these are only a guide and are not absolute limits as in some cases embodiments may lie outside of these valves yet still produce an acceptable product.

According to one particular method, the puree obtained from comminution may be heated to 50°–70° C. by a plate heat exchanger or other heating device prior to entering a deodouriser column. It is anticipated that the deodourising apparatus will typically operate by subjecting the puree to a vacuum or reduced pressure until remaining volatile constituents are substantially removed.

Step 7 DECOLOURISING THE PUREE

This optional step may be performed at the same time as deodourisation though may also be performed subsequently or prior thereto. Typically any deodourisation step will be to remove components such as the chlorophyll and chloroplasts which appear in appreciable quantities in kiwifruit. Many decolourisation techniques are known and may be employed, some possible methods including subjecting the composition to certain levels of heating or by the use of certain chemicals. This is an optional step which may be performed where the colour of the resulting composition is of concern.

Step 8 PRESERVATION

As a further optional step, the resulting composition may be subjected to a UHT treatment, pasteurisation or the equivalent thereof. This is typically to enable the lifetime of the compositions to be extended and/or to comply with any health and hygiene requirements. Alternative methods of preservation may also be employed, although once again care to avoid degradation of the nature pectins or other components conferring the viscosity increasing characteristics to a composition, should be avoided. Aseptic packaging of the composition may ensure:

Step 9 pH ADJUSTMENT

As a further optional step, the pH of the composition may be altered. Typically the pH value will be increased by the inclusion of an alkaline substance, such as sodium or potassium hydrogen carbonate. However many other acceptable pH altering substance for food stuffs are known and may be used providing that they do not introduce any adverse or unwanted reactions into the composition altering its desired characteristics. This includes reactions which affect the taste, colour and palatability of the composition.

As has been previously mentioned, the pH of a kiwifruit is relatively low and occasionally the inclusion of another substance which has the effect of raising the overall pH may be desirable. This may merely be to make the composition compatible with other substances in an ensuing food process. This step may be performed at another point in the method.

Step 10 INCLUDING ADDITIVES

Other materials such as sweetening agents, nutritional additives, colourings, flavourings, spices, acidity regulators, enhancers etc. may be added to the composition. These components may also be added at an earlier stage if required.

Step 11 SUBSEQUENT AERATION AND HOMOGENISATION

The composition obtained thus far may be suitable for many uses. However, in some cases it may be desirable to take the composition one step further and subject it to shearing and/or aeration steps. However, the result of these steps is generally to increase the viscosity of the product and consequently often these steps are not usually performed until the composition from the preceding method steps is to be used in the preparation of another product. One example is the preparation of a product such as mayonnaise or dessert product.

EXAMPLE 2

This method describes the preparation of a soft serve ice-cream formulation from a composition such as obtained from the methods of examples 1 or 3 herein. While there is a variation in the characteristics of the product obtainable within the scope of these methods, it is desirable to use a composition which has added sweetener though this may be added as part of the preparation of the composition being used as an ice-cream precursor. A composition which will thicken upon the application of a shearing force or a combination of a shearing force and aeration, is preferred if not necessary.

For a soft serve ice-cream precursor, it is desirable that the total solid content exceeds 30% and will typically lie within the range 32–36% inclusive. This may exceed the total solid content of the composition obtained according to examples 1 or 3. In these cases, a sweetening agent such as maltodextrin or another mono-saccharide may be added. The proportion may be sufficient to bring the solid content up to the desired level. This may also be useful in the countering (to the taste buds) some of the natural acidity of the kiwifruit and masking any catch factor which may be present in the composition.

To complete the preparation of a soft serve ice-cream product precursor, other optional materials may be included. These may include flavoring agents (such as fruit juices, fruit pulps and purees etc.), colouring agents, artificial sweeteners, spices and other components effecting the taste and physical appearance of the product. Materials such as stabilisers and emulsifiers will not typically be required though may be included in some cases.

The ice-cream product precursor thus far obtained may then be converted into a soft serve ice-cream product by a machine of the type typically used for producing and dispensing such products. Typically this involves subjecting the ice cream precursor to shear and other action within the machine at a certain temperature to result in a change into a product which is typically a combination of serum solids and air bubbles. More specifically, the machines generally comprise a churn, the inside of surface of which is slowly frozen. As this freezing takes place, the ice-cream precursor is frozen onto the surface where upon it is virtually immediately scrapped off by rotating blades and moved towards the centre of the cylinder. This process continues until such time as all the material reaches a certain temperature or viscosity. Air is also incorporated into the mixture during the freezing phase at this stage where upon it may be extruded as a soft serve ice-cream product.

It is noted however that the magnitude of these shearing force is in typical ice cream churn and generally insufficient to cause any substantial thickening of the composition, as compared to what happens during the preparation of a mayonnaise product (see Example 5). In the ice cream products a substantial proportion of thickening occurs as a result of aeration and the relative stability of these air cells from release. It is considered that cooling, to near or below freezing, can assist in enhancing the stability of the cells. It is though that the thickening of the product by chilling may help hold the air cells relatively immobile thereby allowing components in the mixture to form a stronger envelope about the air cell. However there may be other explanations for the sometimes observed effect.

The presence of small air cells help contribute to the illusion of creaminess in the resulting product though ice crystal formation can adversely affect any creamy taste characteristics. It has been found that embodiments of the present invention utilising a composition exhibiting viscosity increasing characteristics under shear, and based on fruit of the genus Actinidia (and in particular kiwifruit) will typically resist the formation of larger ice needles and crystals. However manufacturing technique can influence this aspect. Similarly, a relatively high average particle size for insoluble solids can detract from creamy characteristics, and may also promoter the formation of ice crystals in some circumstances. Ideally, most particles in a composition for use in an ice cream product should be able to pass through a 1.0 mm screen, or more preferably 0.8 mm or less.

A characteristic of a soft serve ice-cream product according to the present invention is that typically its structure will not substantially collapse if the product is allowed to assume room temperature. Typically this is due to the structure of the composition being sufficiently strong to retain and prevent the release of air bubbles from the mixture, even at room temperature. In comparison, a normal dairy based ice-cream product would melt and reconvert to a substantially non-aerated product. This is not necessarily the same as the original ice-cream precursor as the shearing action caused by the blades on the product eventually aversely affects the product to the extent that it can no longer be used to prepare an overrun ice-cream product. This is presumably due to a breakdown in the stabilizers though it is noted that ice-cream precursors and products based on the present invention generally exhibit a much greater resistance to this eventual breakdown than most dairy based compositions. Consequently, a much longer period of churning in such a machine can be experienced before a product no longer having the cream texture of an ideal soft serve ice-cream is produced. A typical formulation of a soft serve ice-cream product precursor according to the present invention may comprise:

| | |
|---|---|
| water | 65 ± 20 pbw |
| sugar (typically sucrose) | 10–30 pbw |
| maltodextrin | 0–8 pbw |
| other mono-saccharides | 0–8 pbw |
| kiwifruit composition (45 Brix) | 5–10 pbw |
| fruit/flavouring | 5–20 pbw |
| stabilisers (optional) | 0–2 pbw |
| acidity regulators | 0–0.1 pbw |

It is noted in the above composition table, given in parts by weight (pbw), that the kiwifruit composition quoted is for a composition at 45 Brix. Accordingly, if a composition of 15 Brix was used, it would be necessary to treble the quantity of composition included. As a predominant function of the composition is to incorporate the viscosity increasing properties into the ice-cream product precursor, these calculations (based on the Brix of the composition being used), should be exclusive of sugars added as part of the composition producing process i.e., when calculating the equivalent amount of compositions of other strengths and concentrations use of, the Brix level is convenient but it is the Brix level due to the natural fruit sugars in the fruit (which are relatively constant due to the initial fruit selection process) which are to be used in the calculations. Consequently if there are added sugars, then this needs to be taken into account when calculating equivalent quantities.

For the ice cream product there is typically an overrun in excess of 10% and preferably 40% or greater.

EXAMPLE 3

Figure 1B:
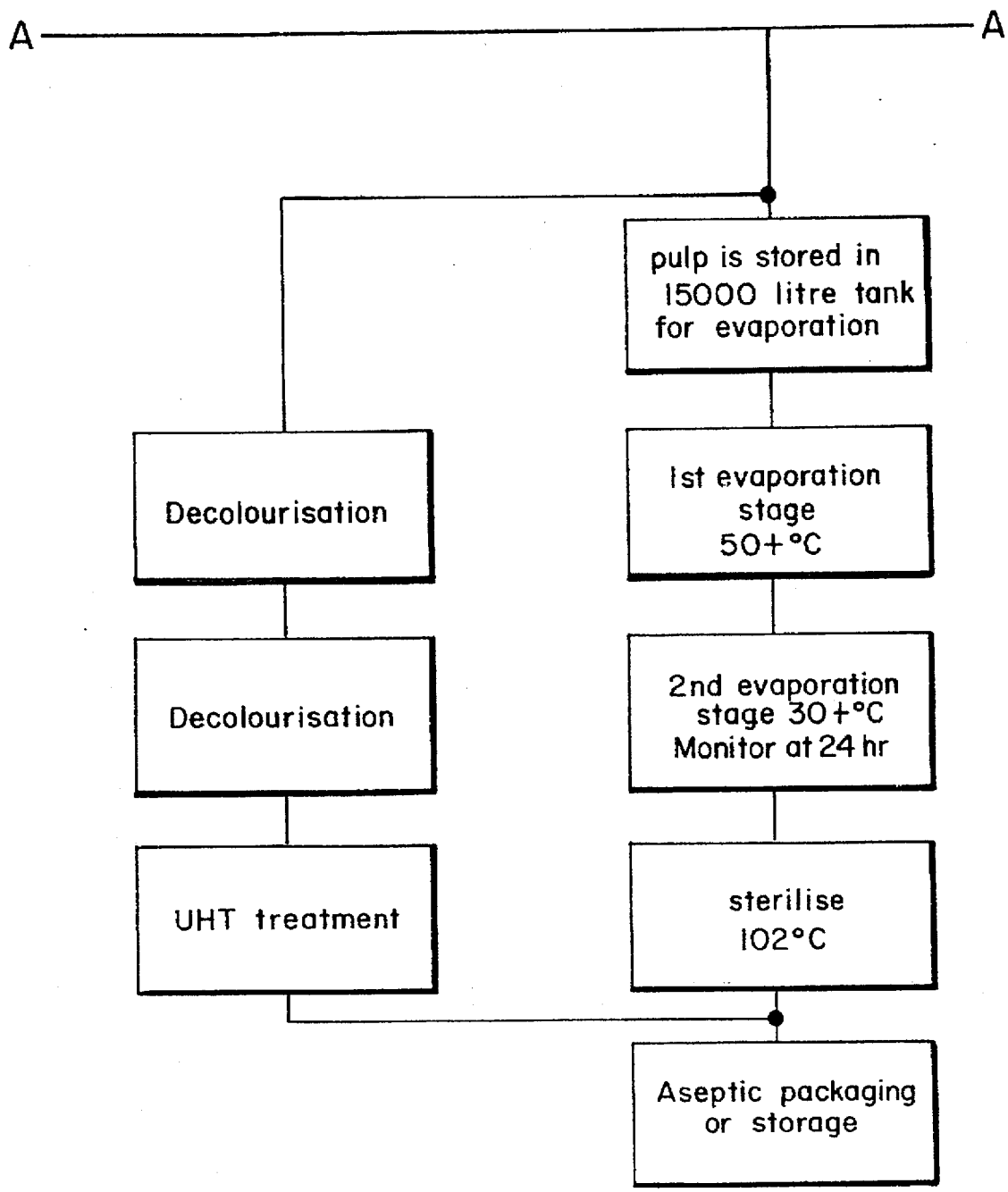

FIG. 1A and 1B illustrate a process which may be used on a large scale for producing a composition. The flow chart of FIG. 1 illustrates two routes. The linear vertical line represents the existing prior art process for preparing a kiwifruit type puree. On the Figure can be seen an alternative route which stems from the storage tank prior to evaporation and rejoins the prior art process at the cooling stage after the two stage evaporation.

The prior art processes are unsuitable for preparing a kiwifruit composition which exhibits viscosity increasing properties when subjected to a shear force, or a shear force and aeration. After considerable trial by the applicants it has been found that the aforesaid desirable properties are destroyed during the evaporation procedures of the prior art process. Accordingly, this has led the applicant to infer that excessive heat and/or concentration of the fruit components is responsible for the loss of these properties. However, conclusive evidence and detailed understanding of what occurs is not yet known though the applicants have succeeded in modifying the large scale prior art process to provide an acceptable product.

Essentially this avoids the usual evaporation stage and instead passes the comminuted material through a deodouriser which removes volatile components. A deodouriser such as commonly used in the art and working within the guide lines set out in example 1, as well as previously within this specification, is generally suitable. A single pass through the deodouriser is generally sufficient though several passes may be made if required by quality control.

UHT treatment or pasteurisation is optional though may be performed to the deodourised product. As the deodourised product will still retain some heat, it is perhaps preferable to perform any UHT or pasteurisation steps at this point. Alternatively the conditions of the deodourising step may be modified so as to provide a UHT or pasteurising effect.

The diversion of the present method from the prior art regions the prior art steps at the cooling stage. Typically the heat which the fruit material has been subjected during deodourisation and any optional heat treatment step is significantly less, and the conditions most favourable, than the extended period of heating in the evaporation step of the prior art.

As can be appreciated, modifications may be made to the steps illustrates in FIG. 1. It is envisaged that a skilled address of the art will be able to adapt the procedure illustrated in FIG. 1, given the guide lines and description of this specification, so that other variations of a process can be put into practice for producing a suitable composition.

EXAMPLE 4

Same possible end uses of a composition according to the present invention will now be discussed by way of example only.

In trails by the applicant, it has been founded a composition according to the present invention is suitable for use as a bulking agent or extender in food products such as jams, sauces, chutneys and pickles. Most compositions according to the present invention, though depending upon the particular method and parameters used in its preparation, will have in subjective terms a clean taste which readily carries flavours such as, fruit flavours; very effectively. It is therefore envisaged that compositions may find use as a flavour enhancer in products such as jams.

Most compositions are also relatively high in fibre as well as pectins and can therefore be used in the manner of a stabiliser for the production of jams and jellies.

Another area of application is in the production of desert related materials such as ice creams (refer example 2) as well as toppings therefor. In these instances, it may be desirable to increase the viscosity of the product by introducing a shearing effect, or incorporating other stabilisers such as commonly used within the food industry (e.g. gums and such like).

A composition may also find use in baked products as an alternative to fat or cholesterol containing products, such as butter, oil or eggs. While the compositions may not always be able to totally substitute for these traditional materials, the inclusion of a composition according to the present invention may be able to reduce the quantities of these traditionally used materials. In trails by the applicants, a composition in liquid form has been found to produce an attractive and palatable fruit loaf when combined with flour, baking powder, spices and added fruit, totally replacing the normal dairy, egg and oil components.

In many of the examples described above, the composition appears to be useful as it can act as a thickener and stabilizer. It is believed that these properties are at least partially derived from fibre content of the composition though more likely predominantly due to the presence of natural pectins. When the composition has been produced with a very small insoluble particle size, it can act as an almost unobtrusive additive in many aspects of food production.

Apart from viscosity related characteristics, most compositions appear to provide some lubricant ability in the same manner as the fats in dairy products. Thus, the production of a soft serve ice-cream type product (example 2) there is an inherent lubricating effect similar to that provided by the fats of dairy based ice-cream products. This mimicking of the physical and organoleptic characteristics of fat extends the ability of compositions to be used in a manner in which they can suggest to the palate the presence of a dairy or fat containing substance. These are characteristics such as the smooth, creamy mouth feel commonly associated with diary based ice creams. It is believed that this is due partially to a composition's relatively fine particle size and the ability of the composition to hold air cells in suspension which aerated, such that minute uniformly sized and substantially spherical shaped air cells are evenly distributed through the composition. Due to the viscosity when the composition is so modified, the walls of the air cells are sufficiently strong so that the air does not readily escape the liquid composition. The human palate cannot perceive the air cells individually but rather perceives them as having this smooth creamy taste and texture of fat or fat globules. Further, the round shape and uniform size of the air cells allows them to roll easily over one another and further assists in the perception of the smoothness and richness normally associated with a fat or cream based product. The avoidance of ice crystals has been previously discussed.

EXAMPLE 5

A composition having viscosity increasing characteristics is obtained by methods such as described in the preceding examples. These is then used for the basis of a mayonnaise or thickened food product. To obtain the required viscosity, the composition is subjected to a shearing force such as provided in a homogeniser or vortex mixer.

When suitable thickened, other desirable components, such as flavourings, colourings, vinegars, oils etc. may be introduced. A wide variety of mayonnaises and sauces are known and thus there is a wide variation in the further ingredients which may be added to the thickened base material.

EXAMPLE 6

A composition based on fruit of the genus Actinidia is obtained, this composition exhibiting viscosity increasing characteristics under shear, or shear plus aeration. The following ingredients are combined:

| | |
|---|---|
| 5–15 pbw | a base composition (45 Brix) |
| 0–15 pbw | fruit juices or flavouring |
| 20–30 pbw | sucrose |
| 3–10 pbw | maltodextrin |
| — pbw | water or liquids to adjust total solids content |

The total solids content of the blended composition, which will be used as an ice cream precursor, should fall within the range of 30–37%, an optimum figure being 32–35%. Other optional ingredients, such as flavourings, colourings etc. may be included.

The resulting composition is subjected to normal ice cream making procedures, with a result being an acceptable soft-serve ice cream type product.

EXAMPLE 7

A composition or ice cream precursor according to the preceding examples, or within the scope of the invention, may be dried to a substantially solid material. This may be a powdered, granular or flaked type product and will partially depend upon the drying process. This dried form can generally be reconstituted with liquids, with little appreciable decrease in any desirable characteristics.

The effect of excessive heating for extended periods has been previously mentioned. Consequently drying procedures which avoid these pitfalls are preferred. Examples of acceptable drying techniques which may be used with caution include spray drying, vacuum drying and roller drying techniques.

Aspects of the present invention have been described by way of example only and it should be appreciated that modifications and additions may be made thereto without departing from the scope thereof as defined in the appended claims.

I claim:

1. A puree derived from the fruit of the genus Actinidia having substantially little degradation of the fruit's naturally occurring pectins, the puree being further characterised in that its viscosity will increase upon the application of a shear force, or shear force and aeration.

2. A puree as claimed in claim 1 in which will form minute, long-lived, substantially spherical air cells when aerated.

3. A puree derived from fruit of the genus Actinidia prepared by a method in which the fruit is processed under conditions avoiding substantial degradation of the natural occurring fruit pectins, said method including at or near its beginning, a process step in which the fruit is substantially heated to a temperature of 80° C. or greater.

4. A puree as claimed in claim 3 wherein the heated fruit is allowed to stand without cooling for a period of time.

5. A puree as claimed in claim 3 which will increase in viscosity upon the application of a shear force, or shear force and aeration.

6. A puree as claimed in claim 1 wherein the shear force is the same or equivalent to that provided by a vortex mixer.

7. A puree as claimed in claim 1 wherein the fruit is from the species *Actinidia Chinensis*.

8. A puree as claimed in claim 1 which is substantially homogeneous in nature.

9. A puree as claimed in claim 1 which has been passed through a screen with a mesh of 1.0 mm.

10. A puree as claimed in claim 1 which has not been concentrated by more than 100% with respect to the bulk raw fruit.

11. A puree as claimed in claim 1 which has been subjected to a low temperature concentrating step.

12. A puree as claimed in claim 11 wherein the concentrating step comprises at least one of: a roller drying, a freeze drying, and a vacuum drying process.

13. A puree as claimed in claim 1 which has been subjected to UHT treatment, pasteurisation or the equivalent thereof.

14. A thickened product prepared from a puree as claimed in claim 1 which has been subjected to a shear force.

15. A thickened product prepared from a puree as claimed in claim 1 which has been aerated.

16. A puree is claimed in claim 15 which has also been subjected to aeration of 10% over-run or greater.

17. A food product having at least 20% over-run comprising a puree as claimed in claim 1.

18. A food product as claimed in claim 17 which has been thickened by the application of a shear force, or shear force plus aeration.

19. A food product as claimed in claim 17 which includes an added sugar.

20. A food product as claimed in claim 17 wherein puree further comprises insoluble particles which will pass through a screen with a mesh size of 1.0 mm.

21. A soft-serve ice-cream product, having an over-run of at least 40% comprising a puree derived from the fruit of the genus Actinidia according to claim 1 and a sweetening agent comprising at least a mon-saccharide or a poly-saccharide, and in which the components have been subjected to the conditions of a conventional ice-cream making process or machine.

22. A soft-serve ice-cream product as claimed in claim 21 comprising, in parts by weight (pbw):

| | |
|---|---|
| 5–15 pbw | a base puree (45 Brix) |
| 0–15 pbw | fruit juices or flavouring |
| 20–30 pbw | sucrose |
| 3–10 pbw | maltodextrin |
| 0– pbw | water or liquids to adjust total solids content |

23. A soft-serve ice-cream product as claimed in claim 21 comprising, in parts by weight (pbw):

| | |
|---|---|
| water | 65 ± 20 pbw |
| sugar (typically sucrose) | 10–30 pbw |
| maltodextrin | 0–8 pbw |
| other mono-saccharides | 0–8 pbw |
| kiwifruit puree (45 Brix) | 5–10 pbw |
| fruit/flavouring | 5–20 pbw |
| stabilisers (optional) | 0–2 pbw |
| acidity regulators | 0–0.1 pbw |

24. A soft-serve ice-cream product as claimed in claim 21 wherein the total solid content, by weight, is within the range 30–45%.

25. A soft-serve ice-cream product as claimed in claim 21 which includes at least one of the group of: added flavouring, added colouring, spices and flavour enhancers.

26. A soft-serve ice-cream product as claimed in claim 21 which is free of added stabilisers.

27. A method for preparation of a puree derived from the fruit of the genus Actinidia, comprising the steps of:

(a) heating the fruit to a temperature above 80° C. for a period of time sufficient to heat the fruit to its center;

(b) allowing said heated fruit to stand about 30 minutes; and (c) comminuting the fruit in a fruit finisher.

28. A method as claimed in claim 27 wherein heating of the fruit occurs prior to comminution.

29. A method as claimed in claim 27 wherein heating of the fruit occurs immediately after comminution.

30. A method as claimed claim 27 which includes the inclusion of fruit other than that of the genus Actinidia.

31. A method as claimed in claim 27 which includes shearing or aeration.

32. A method as claimed in claim 27 wherein conditions amenable to the degradation of naturally occurring pectins are avoided.

33. A method as claimed in claim 27 which includes a cool concentrating step.

34. A method as claimed in claim 27 which includes a step of UHT treatment, pasteurisation or the equivalent thereof.

35. A method as claimed in claim 27 which does not include a traditional evaporation step of heating the composition over 45° C.

36. A composition prepared from a method as claimed in claim 27 which will increase in viscosity when subjected to at least one of a shear force, aeration, and shear force plus aeration.

37. A puree prepared from a method as claimed in claim 27 having substantially little degradation of naturally occurring pectins.

38. A puree prepared from a method as claimed in claim 31 which includes minute, substantially spherical, long-lived air cells.

39. A method as claimed in claim 27 wherein the skin of said fruit is removed prior to heating the fruit.

40. A method as claimed in claim 27 wherein the skin of said fruit is removed after heating the fruit.

* * * * *